(12) United States Patent
Donald et al.

(10) Patent No.: US 6,200,472 B1
(45) Date of Patent: Mar. 13, 2001

(54) THREE STAGE SEWAGE TREATMENT SYSTEM

(76) Inventors: Hubbard H. Donald; George E. Johnson, both of 2247 Hwy. 151 North, Downsville, LA (US) 71234

( * ) Notice: Subject to any disclaimer, the term of this patent is extended or adjusted under 35 U.S.C. 154(b) by 0 days.

(21) Appl. No.: 09/280,492

(22) Filed: Mar. 30, 1999

Related U.S. Application Data (60) Provisional application No. 60/079,891, filed on Mar. 30, 1998.

(51) Int. Cl.$^7$ ........................................... C02F 3/20
(52) U.S. Cl. ................................ 210/195.1; 210/195.4; 210/202; 210/256; 210/259; 210/532.2
(58) Field of Search .......................... 210/195.1, 195.3, 210/195.4, 202, 256, 258, 259, 532.2, 104, 220

(56) References Cited

U.S. PATENT DOCUMENTS

| | | | |
|---|---|---|---|
| 3,741,393 | * | 6/1973 | Estes et al. .................. 210/195.4 |
| 4,608,157 | * | 8/1986 | Graves ......................... 210/532.2 |
| 4,650,577 | * | 3/1987 | Manul .......................... 210/195.3 |
| 4,933,076 | * | 6/1990 | Oshima et al. ............... 210/195.1 |
| 5,221,470 | * | 6/1993 | McKinney .................... 210/195.4 |
| 5,490,935 | * | 2/1996 | Guy ............................. 210/195.3 |
| 5,492,635 | * | 2/1996 | Bull ............................. 210/532.2 |
| 5,549,818 | | 8/1996 | McGrew, Jr. . |
| 5,667,089 | * | 9/1997 | Graves ......................... 210/532.2 |
| 5,879,550 | * | 3/1999 | Cox ............................. 210/195.4 |

OTHER PUBLICATIONS

Murphy Cormier Gen. Cont. Inc., Hoot Brochure.

* cited by examiner

Primary Examiner—Christopher Upton
(74) Attorney, Agent, or Firm—Phelps Dunbar, L.L.P.

(57) ABSTRACT

The Three Stage Sewage Treatment System ("TSSTS") processes sewage for buildings not connected to a municipal sewer system. It employs a three stage process for cleaning sewage in a single, light-weight, easy-to-install unit. Sewage is initially cleaned anaerobically in the pre-treatment tank as gravity acts to separate solids from the effluent. Sewage then flows into the aerobic tank for further cleaning by aerobic microorganisms and continued gravity separation of solid contaminants from the effluent. The aerobic tank is divided into an inner chamber and an outer chamber by a funnel-shaped clarifier. In the TSSTS, the clarifier is a separate piece with a lip around the top of the funnel-shaped main body. The lip of the clarifier rests atop the sidewalls of the aerobic tank, and the clarifier hangs down in the aerobic tank, with an opening in the bottom of the clarifier held above the bottom of the aerobic tank. Air droptubes hang down in the outer chamber of the aerobic tank, so that sewage in the upper part of the outer chamber is aerated, stimulating anaerobic microorganisms which digest the sewage. An air feed conduit connects the air droplines to an external air compressor and rests upon a rim on the clarifier. The sewage in the outer chamber moves into the inner chamber inside the clarifier where gravity separates solids from the effluent. This cleaned effluent is then drained to the post-treatment tank where it is chlorinated and stored for discharge. The TSSTS uses a single cover to seal all three tanks, adding structural support while simplifying manufacture. To reduce the weight, aiding in installation, while retaining the strength and durability needed for a sewage system, the TSSTS is generally made of fibreglass reinforced plastic.

19 Claims, 4 Drawing Sheets

THREE STAGE SEWAGE TREATMENT SYSTEM

This application claims the benefit of U.S. Provisional Application No. 60/079,891, filed Mar. 30, 1998.

BACKGROUND OF THE INVENTION

This invention relates to the treatment of sewage. More particularly, this invention relates to the treatment of sewage discharged from houses and other buildings which are not connected to a municipal sewer system such that, after the sewage has passed through the three stage sewage treatment system (TSSTS), it has been cleaned to a level acceptable for discharge into the environment so that it will not contaminate the ground water. Thus, the TSSTS provides an alternative to septic systems for buildings constructed outside of a local municipal sewer system.

There are several versions of the conventional sewage treatment system which use aerobic microorganisms to break down sewage. One such device is seen in U.S. Pat. No. 5,549,818. This conventional sewage treatment device consists of a cylindrical tank which encompasses a funnel-shaped clarifier. Thus, the cylindrical tank is divided into an outer chamber, between the outer wall of the tank and the clarifier, and an inner chamber, inside the clarifier. Air is introduced into the outer chamber by multiple air droplines, which are connected to an air compressor and which pump air bubbles into the sewage in the outer chamber. Sewage flows into the outer chamber where it comes in contact with the air bubbles. The introduction of air facilitates the breakdown and digestion of the sewage by aerobic microorganisms present in the sewage. The aerated sewage then proceeds into the clarifier through an opening at the bottom of the funnel-shaped clarifier. Inside the clarifier is a quiescent zone. This area of calm in the inner chamber of the device allows for settling to occur, with the solids falling back out of the clarifier and collecting on the bottom of the treatment tank. Accordingly, the waste water becomes cleaner as it progresses upward in the funnel-shaped clarifier, continuing to allow gravity to separate the solids from the water. So, by the time the sewage has progressed up through the clarifier, it has been substantially cleaned. This treated effluent exits near the top of the clarifier and is discharged.

The Three Stage Sewage Treatment System (TSSTS) employs a more comprehensive three step process to clean sewage. Thus, it is able to treat sewage more thoroughly than conventional devices while still offering a single, simple-to-install unit for this complete processing of sewage, The sewage first enters a pretreatment area. It then proceeds to an aeration chamber followed by a settling chamber in a clarifier. Finally, the sewage enters a post-treatment area, where it is chlorinated before discharge. Through this multi-step process, the TSSTS produces a cleaner effluent.

SUMMARY OF THE INVENTION

The TSSTS is a single device utilizing a three stage procedure for treating sewage. The TSSTS is comprised of a pre-treatment tank, which holds the sewage for a time while allowing the anaerobic microorganisms in the sewage to begin initially breaking down the sewage, an aerobic tank, in which the sewage is aerated to allow aerobic microorganisms to further break down the sewage and then clarified as the heavier particles separate from the effluent, and a post-treatment tank, which chlorinates the effluent before discharge. All three tanks are joined into a single unit, allowing for convenient installation.

The raw sewage enters the pre-treatment tank first to allow the anaerobic microorganisms in the sewage to begin the initial processing of the sewage. The pre-treatment tank has side walls and a bottom, and the top is sealed by a removable cover. Anaerobic microorganisms feed on the sewage, breaking it down in the process. The pre-treatment tank also serves to screen out objects which would hamper the functioning of the aerobic tank. As the pretreatment tank continues to accept raw sewage, sewage is forced out of the pre-treatment tank through the outlet conduit. Near the top of the pre-treatment tank is a overflow conduit which leads to the aerobic tank. Gravity will segregate the sewage in the pre-treatment tank, such that light solids will float upon the surface while heavy solids will settle to the bottom. In between these two zones is a zone of effluent which is relatively free of particles. The overflow conduit drains sewage from this particle-free zone beneath the surface level, thereby screening out floating solids and heavy solids. An effluent filter, which is not required, may cover the opening of the overflow conduit to further prevent large particles from passing through the overflow conduit. In this way, the overflow conduit traps the large solid contaminants so that they do not enter the aerobic tank and clog the device. After the raw sewage has been gravity separated and processed by anaerobic microorganisms, it flows into the aerobic tank for the next stage of the treatment process.

The aerobic tank is a vessel with sidewalls and a bottom, and the top is sealed by a removable cover. The tank encompasses a funnel-shaped clarifier. The clarifier is wide near the top of the aerobic tank and narrows towards the bottom of the tank, and there is an opening in the bottom of the clarifier. There are many methods which could be used to hold the clarifier in place inside the aerobic tank. The TSSTS uses a clarifier design with a lip that overhangs the sidewalls of the aerobic tank. Thus, the clarifier actually hangs down from the top of the sidewalls. The lip of the clarifier is held firmly in place between the top of the aerobic tank sidewalls and the cover for the aerobic tank. The funnel-shaped main body of the clarifier is offset slightly down from the top of the tank, so that there is a gap between the top of the clarifier and the top of the aerobic tank. This offset provides clearance for the air feed conduit. The clarifier hangs down inside the vessel, not reaching down to the bottom of the aerobic tank but leaving an area of clearance between the bottom of the clarifier and the bottom of the aerobic tank. Thus, the aerobic tank is divided into two chambers by the clarifier. Between the outer sidewalls of the aerobic tank and the clarifier is the outer chamber, where aeration of the sewage occurs, while the volume inside the clarifier is the inner chamber of the aerobic tank, where solid particles are gravity separated from the effluent.

Running down into the outer chamber of the aerobic tank from the top of the aerobic tank are droplines. These droplines are typically distributed in the outer chamber such that they provide for aeration throughout the upper part of the outer chamber, above the bottom of the clarifier. These droplines are conduits which are typically capped at the bottom end and which have small holes for emitting air. The top end of these droplines are connected to an air feed conduit which directs air from the compressor, so that the droplines will emit air bubbles into the outer chamber, aerating the sewage passing through the outer chamber of the aerobic tank. The inner chamber, located inside the clarifier, is screened from the aerating effect of the droplines by the walls of the clarifier, so this inner chamber is a non-turbulent, quiescent zone. Near the top of the inner chamber with its opening located inside the clarifier is an outlet drain leading to the post-treatment tank. Typically, the outlet drain is comprised of an outlet conduit, extending from the clarifier of the aerobic tank to the post-treatment tank, and a T-Baffle, which controls the flow of effluent into the outlet conduit. The T-Baffle is comprised of two T-joints. The first T-joint connects to the outlet conduit and extend upwards and downwards from the outlet conduit. The second T-joint connects to the bottom of the first T-joint, so that its two openings extend out perpendicularly from the openings of the first T-joint. The uppermost opening of the first T-joint extends above the fluid level within the clarifier, acting as a vent for the T-Baffle. Both of the openings for the second T-joint are beneath the fluid level within the clarifier. Thus, the effluent enters the T-Baffle through the two lower openings and then flows into the outlet conduit, out of the clarifier of the aerobic tank and into the post-treatment tank. Because a film of scum can form atop the liquid in the aerobic tank, the T-Baffle acts to drain effluent from beneath the surface of the fluid to provide for a cleaner effluent discharge from the aerobic tank.

The sewage, which has already been initially processed by anaerobic microorganisms, enters the aerobic tank through the overflow conduit located near the top of the aerobic tank. The sewage moves into the outer chamber of the aerobic tank and descends downward through the outer chamber as additional sewage enters the aerobic tank through the overflow conduit. As the sewage descends, it passes through the air bubbles emitted from the drop lines. This excites the sewage, causing turbulent motion, as it aerates the sewage. Injecting air into the sewage activates and stimulates the aerobic microorganisms in the sewage. This causes the aerobic microorganisms to multiply and increases the amount of sewage that they digest. This aerobic process eliminates sewage contaminants to a great extent, cleaning the sewage. After passing through the aeration zone of the outer chamber of the aeration tank, the sewage enters a relatively calm zone below the air holes in the drop lines. Here, settling begins to occur, with heavier solids falling towards the bottom of the aerobic tank. The sewage in the quiescent zone is displaced upwards and through the opening in the bottom of the clarifier and into the inner chamber of the aerobic tank as more sewage enters the outer chamber of the aerobic tank. The sewage in the inner chamber is in a relatively calm state, and so contaminants, acted upon by gravity, will continue to settle downwards. In this way, the clarifier acts to screen out solid contaminants from the effluent. This continuous process results in a very clean effluent at the top of the inner chamber, where it is drained off by the T-Baffle and flows out of the aerobic tank through the outlet conduit and into the post-treatment tank.

While the post-treatment tank and the pre-treatment tank may be located anywhere around the aerobic tank, the post-treatment tank is generally located on the opposite side of the aerobic tank from the pre-treatment tank. It has sidewalls and a bottom, and the top is sealed with a removable cover. The outlet conduit enters the post-treatment tank near the top of the tank. There, it connects to a chlorinator, through which the effluent passes into the storage space of the post-treatment tank. When passing through the chlorinator, the effluent is chlorinated, generally by flowing across a chlorine tablet. The cleaned effluent is held in the post-treatment tank until it rises to a level which activates a float switch, triggering a pump, which can be either internal or external, discharging the cleaned effluent.

For convenience, the TSSTS connects the pre-treatment tank and the post-treatment tank to the aerobic tank, creating a single unit which performs this three stage cleaning process for sewage. The top of the three tanks are capped to make the TSSTS a closed system. Each of the cover caps are generally convex in shape (dome-shaped) and sized to fit the respective tank it is capping. This strengthens the tanks from collapsing under the weight of the earth beneath which they are buried. Rather than individual cover caps for each tank, however, a single cover for the entire TSSTS device is preferred. This single cover needs to be formed so that it seals each tank individually, so that there can be no sewage gas transfer between the tanks. In addition, chlorine cannot be allowed to flow from the post-treatment tank to the aerobic tank, as that would kill the aerobic microorganisms which are crucial to the cleaning process. The single cover is also preferably formed to incorporate convex sections over each tank for strength purposes. The portion of the cover for each tank can have a service hatch for maintenance. Generally, there is a riser extending from the top of the aerobic tank, allowing for inspection and cleaning of the aerobic tank. Also, there is generally a larger high riser on the post-treatment tank, large enough to allow for installation of an internal pump in the post-treatment tank, with a loose fitting cap that allows for venting of air from the system. It is also through this riser that an external pump would operate.

While the TSSTS can be made of any non-porous, non-toxic, solid material, a strong, lightweight material is preferable for convenience in installation. Preferably, the TSSTS is formed of fibreglass reinforced plastic, keeping the weight of the TSSTS to that reasonable for simple installation without the need for lifting machinery.

Generally, the tanks are sized so that they do not have to be pumped clean very often, on average requiring cleaning once a decade. In addition, the sizes of the tanks are dependant upon the expected amount of sewage generated by the buildings they service on a daily basis. The aerobic tank must also be sized so that the sewage remains in it long enough for the aerobic microorganisms to effectively process the sewage. The TSSTS is typically installed below ground, buried in the yard of a residence, so its compact design simplifies installation and minimizes the amount of damage to the yard.

It is an object of this invention to clean sewage in preparation for discharge. In doing so, this invention captures large solids in the pre-treatment tank, uses both anaerobic and aerobic processes to break down the sewage, separates the contaminants from the sewage water, and chlorinates the effluent. It is still another object of this invention for it to be easy to install and for it to be durable, requiring very little maintenance. It is yet another object of this invention to provide a three stage sewage cleaning process in a single, compact unit. It is yet another object of this invention to discharge water which meets or exceeds state water quality requirements. It is yet another object of this invention to allow for inspection of the tanks and to allow for cleaning and maintenance of the invention.

BRIEF DESCRIPTION OF DRAWINGS

Reference will be made to the drawings where like parts are designated by like numerals and wherein.

DETAILED DESCRIPTION OF PREFERRED EMBODIMENT

Referring now to the drawings in more detail, the preferred embodiment of the TSSTS is generally designated by the numeral 10.

The TSSTS is comprised of three tanks which are rigidly joined together into a single unit. The central tank of the three, which is generally the largest, is the aerobic tank 40. Although it may be any shape, the preferred embodiment is cylindrical with a closed bottom. Also, although the size of the aerobic tank 40 can vary depending upon the amount of sewage that the TSSTS will likely receive, the aerobic tank 40 generally ranges from 500 to 1500 gallons, with the preferred embodiment holding 1000 gallons. The other two tanks 20 and 60 are generally smaller than the aerobic tank 40. The tanks 20 and 60 typically range in size from 400 to 1000 gallons, and in the preferred embodiment they each hold 516 gallons respectively. Again, the pre-treatment tank 20 and the post-treatment tank 60 can have any shape so long as they have sidewalls and a bottom (so that they can contain the sewage), but in the preferred embodiment both the pre-treatment tank 20 and the post-treatment tank 60 are roughly rectangular in cross-section. The pre-treatment tank 20 and the post-treatment tank 60 are rigidly attached to the aerobic tank 40, and in the preferred embodiment, the pretreatment tank 20 is located on the opposite side of the aerobic tank 40 from the post-treatment tank 60. Although the aerobic tank 40, the pre-treatment tank 20, and the post-treatment tank 60 can be made of any non-porous, non-toxic, solid material, in the preferred embodiment of the TSSTS all of the tanks 20, 40, 60 are formed of fibreglass reinforced plastic.

Each of the tanks in the TSSTS must be covered. The cover can be an integrated part of the tank, but generally the cover is a separate, distinct component to simplify both construction and maintenance. The top of the tanks can be sealed by having a separate cover for the pre-treatment tank 20, for the aerobic tank 40, and for the post-treatment tank 60, or a single cover can seal all three at once. In the preferred embodiment, a single cover 56 is used to cap the pre-treatment tank 20, the aerobic tank 40, and the post-treatment tank 60. The cover 56 must seal each tank from the others to prevent any flow of gases between the three stages of the TSSTS. Also, in the preferred embodiment the cover 56 has convexly curved portions sealing each of the three tanks, as this convex design strengthens the cover 56 so that it can resist the downward forces applied on it when it is buried beneath the ground.

Figure 1:
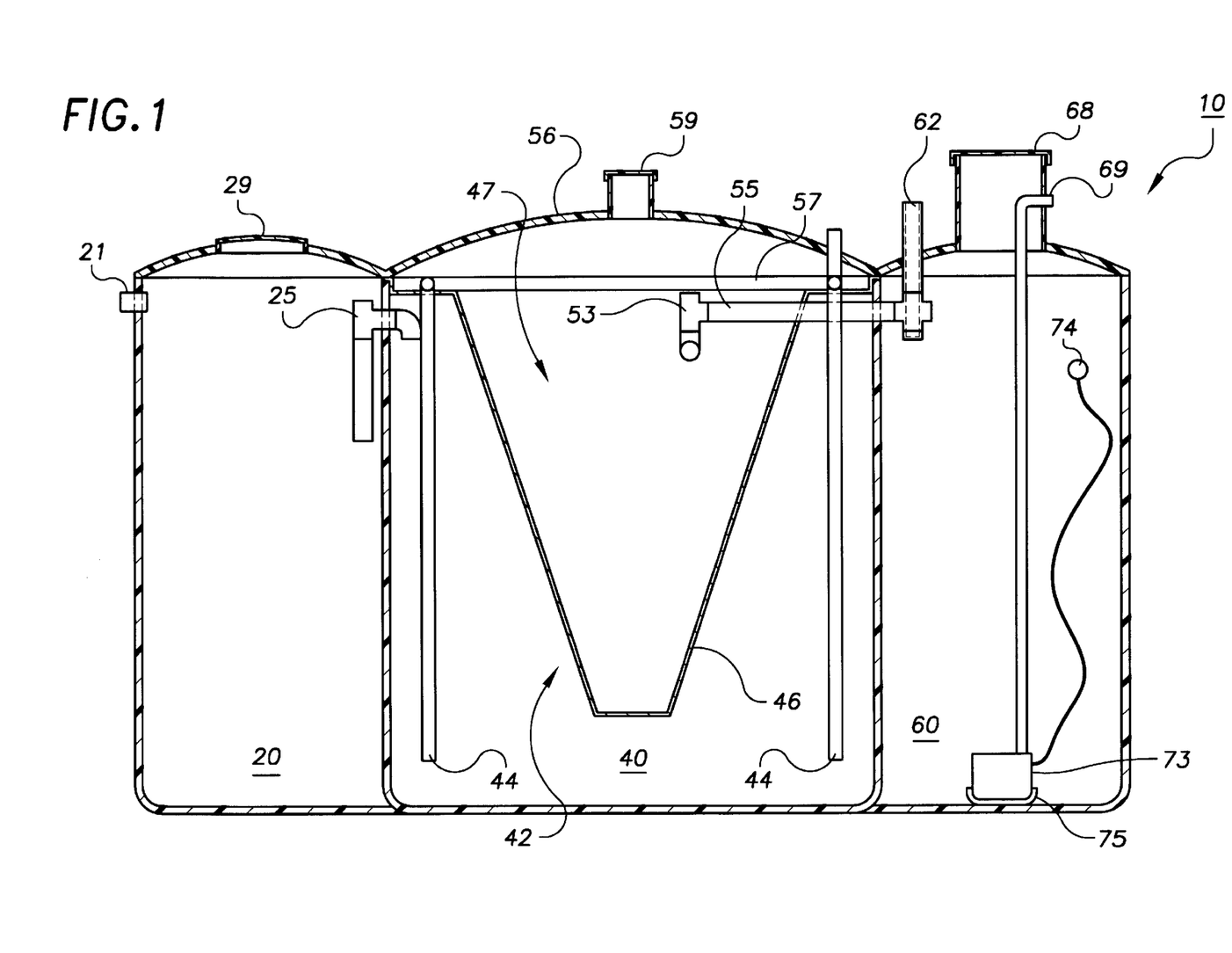
FIG. 1 is a side view of the TSSTS.
Figure 2:
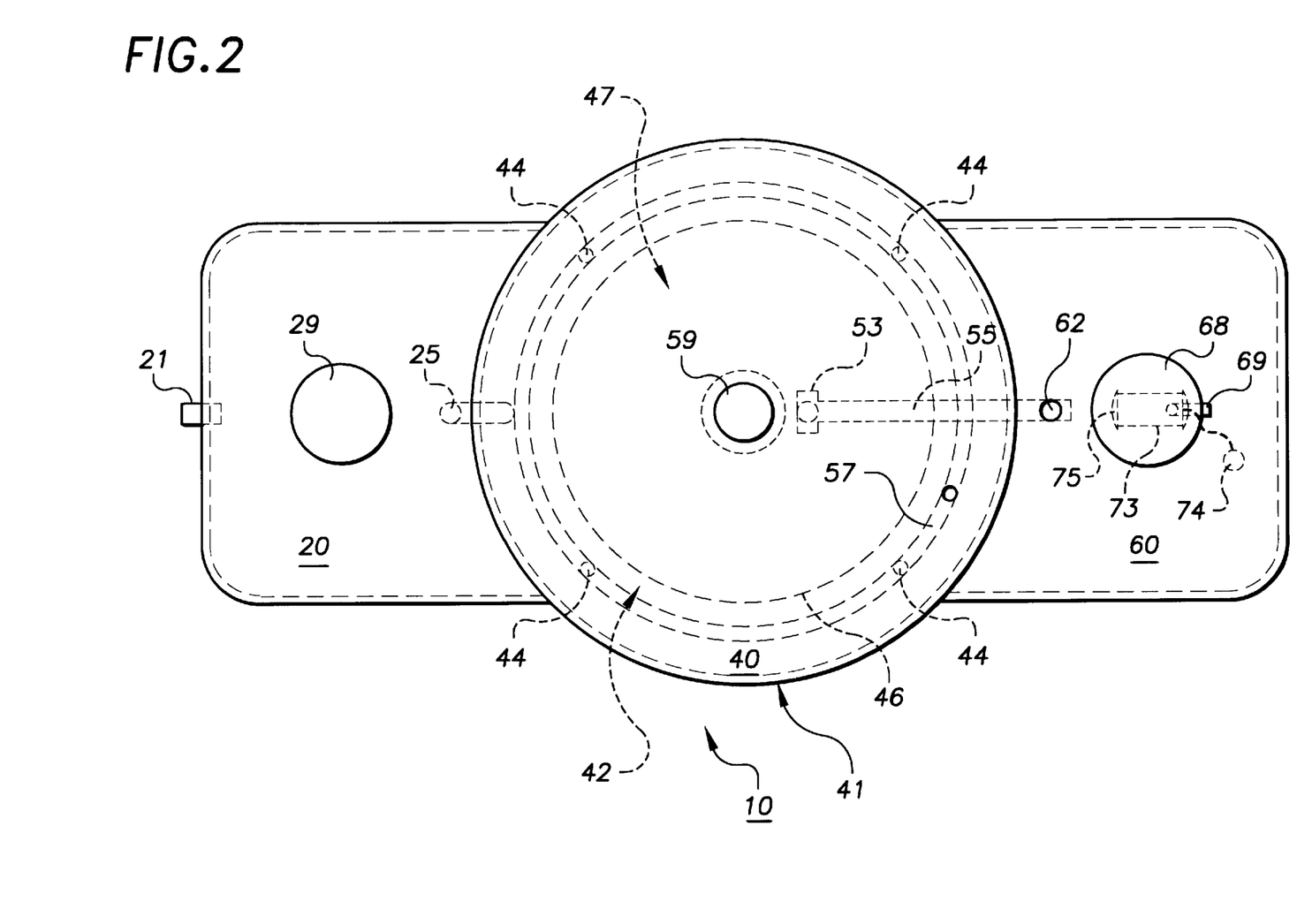
FIG. 2 is an overhead view of the TSSTS.
Figure 3:
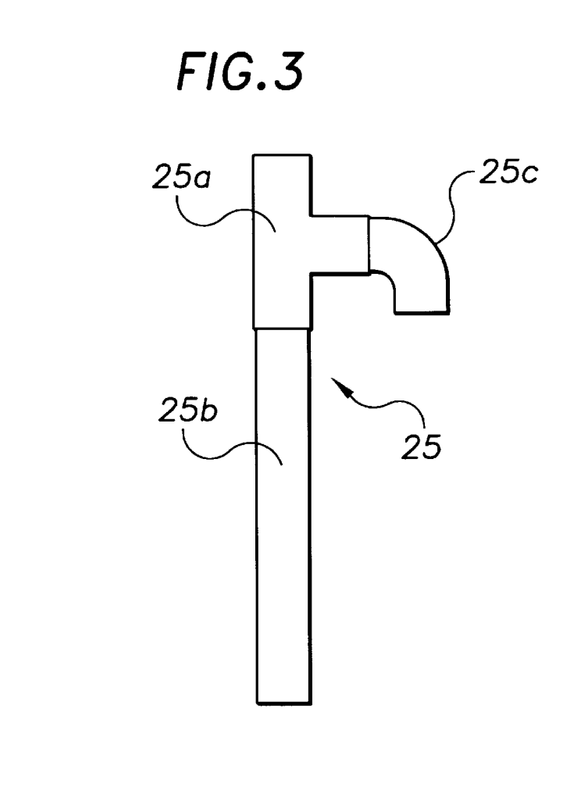
FIG. 3 is a side view of the overflow conduit 25 in the TSSTS.

The pre-treatment tank 20 has an inlet port 21 in its sidewall where the sewage flows into the TSSTS. Generally, the inlet port 21 is located near the top of the pretreatment tank 20 away from the connection to the aerobic tank 40. Located near the top of the pre-treatment tank 20 on the wall of the pre-treatment tank 20 adjacent to the aerobic tank 40 is an overflow conduit 25 which penetrates the wall between the pre-treatment tank 20 and the aerobic tank 40 and allows for sewage to flow from the pre-treatment tank 20 into the aerobic tank 40. The purpose of the overflow conduit 25 is to transport sewage, which has been in the pre-treatment tank 20 for a sufficient duration of time to allow the anaerobic microorganisms to begin processing the sewage, from the pre-treatment tank 20 to the aerobic tank 40 for further processing. The overflow conduit 25 draws effluent from beneath the surface, in the relatively particle-free zone of effluent between the surface, where light particles float, and the bottom, where the heavy particles settle. An effluent filter can cover the overflow conduit 25 to further reduce the amount of solid contaminants entering the aerobic tank. In the preferred embodiment, the overflow conduit 25 is comprised of a T-joint 25a, a length of straight conduit 25b, and a directional bend 25c (see FIG. 3). One branch of the T-joint 25a passes through the common wall of the pretreatment tank 20 and the aerobic tank 40. The remaining branches of the T-joint 25a project up towards the top of the pretreatment tank 20 and down towards the bottom of the pre-treatment tank 20. The upper branch of the T-joint 25a is open and extends above the sewage surface level to act as a vent. The straight conduit 25b is rigidly attached to the bottom branch of the T-joint 25a. The straight conduit 25b extends down a short distance beneath the sewage fluid level in the pre-treatment tank 20 so that it takes sewage from near the surface but not from the surface of the sewage itself, where there may be material floating. On the other side of the common wall between the pre-treatment tank 20 and the aerobic tank 40, the directional bend 25c of the overflow conduit 25 is rigidly attached to the T-section 25a so that it directs the sewage flow downward into the aerobic tank 40.

Figure 6:
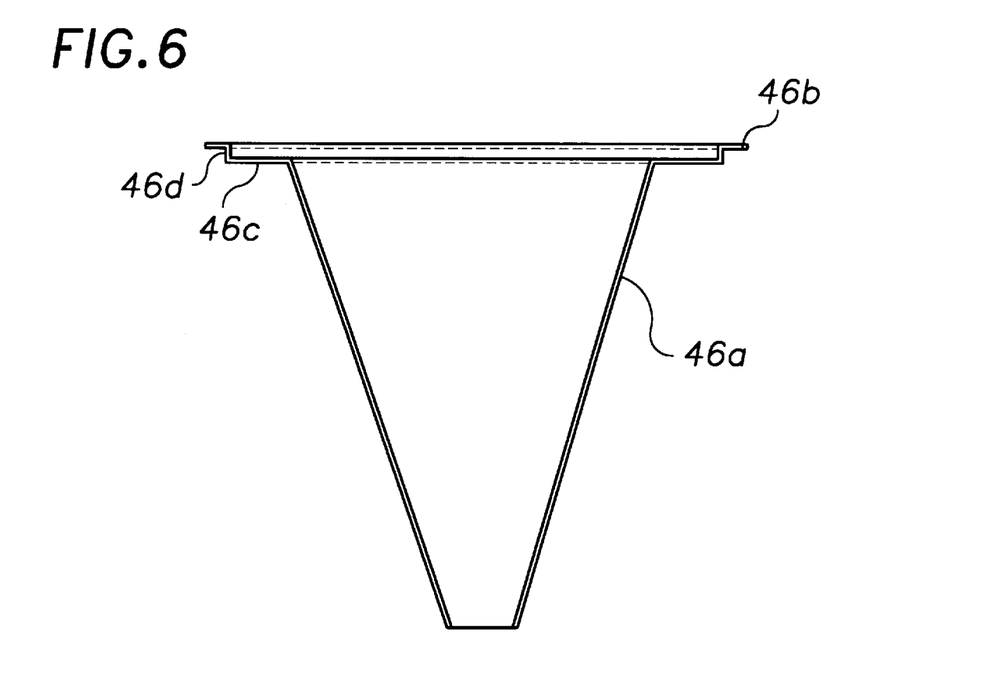
FIG. 6 is a cut-away side view of the clarifier 46.
Figure 7:
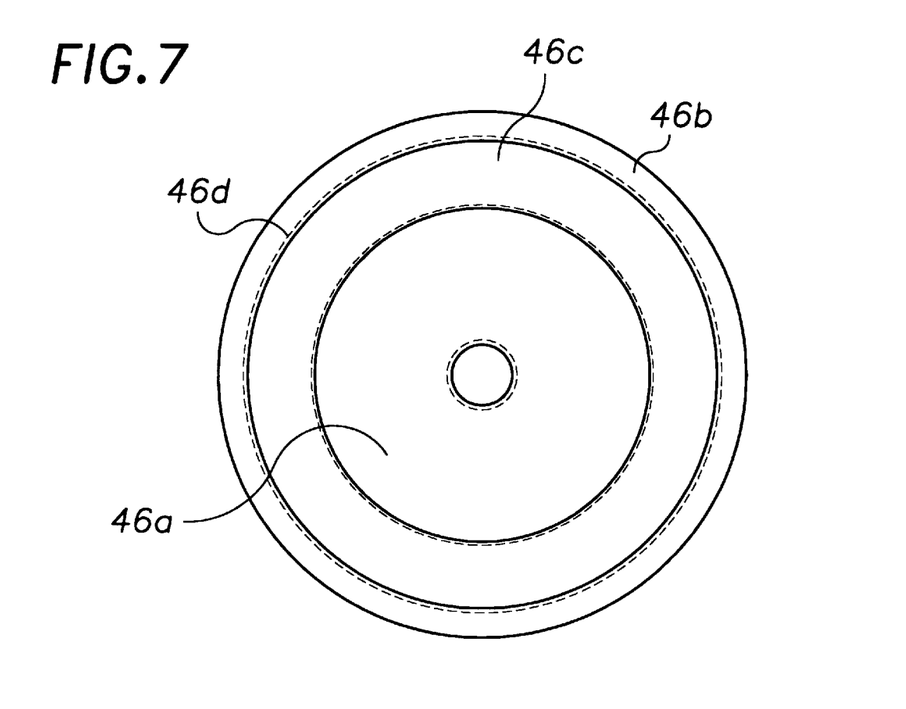
FIG. 7 is an overhead view of the clarifier 46.

Within the aerobic tank 40 of the TSSTS, is a funnel-shaped clarifier 46. The clarifier 46 is wide near the top of the aerobic tank 40 and narrow near the bottom of the aerobic tank 40, with a hole in the bottom of the clarifier 46. The preferred embodiment uses a clarifier 46 design with a lip 46b that overhangs the sidewalls 41 of the aerobic tank 40 (see FIG. 6). Thus, the clarifier 46 actually hangs down from the top of the sidewalls 41. The lip 46b of the clarifier is held firmly in place between the top of the aerobic tank sidewalls 41 and the cover 56 for the aerobic tank. The funnel-shaped clarifier main body 46a is offset slightly down from the top of the tank, so that there is a gap between the top of the clarifier main body 46a and the top of the aerobic tank 40. This offset 46d provides clearance for the air feed conduit 57. Also, in the preferred embodiment, the clarifier main body 46a is set slightly in radially from the sidewalls 41 of the aerobic tank 40, providing a rim 46c on which the air feed conduit 57 may lie. The clarifier 46 hangs downward in the aerobic tank 40, but does not extend all the way to the bottom of the aerobic tank 40; instead there is a gap between the bottom of the clarifier 46, which is the small end of the funnel, and the bottom of the aerobic tank 40. Thus, the clarifier 46 divides the aerobic tank 40 into two chambers. The outer chamber 42 of the aerobic tank 40 is located between the sidewall of the aerobic tank 40 and the clarifier 46. The inner chamber 47, is located inside the funnel-shaped clarifier 46. Located in the outer chamber 42 of the aerobic tank, are one or more air droplines 44 which hang down into the sewage from the top of the aerobic tank 40. These droplines 44 are conduits, generally capped at the bottom ends, with holes for emitting air bubbles. In the preferred embodiment, the droplines 44 are cylindrical conduits. The top ends of the plurality of droplines 44 are connected to an air feed conduit 57 which leads to an external air compressor. Thus, when the air compressor is operating, air flows through the air feed conduit 57, into the droplines 44, and bubbles out into the sewage in the outer chamber 42 of the aerobic tank 40. For best results, the droplines 44 should not emit air bubbles beneath the bottom of the clarifier 46. While this may be accomplished by restricting the length of the droplines 44 so 11, that they do not extend down beneath the bottom of the clarifier 46, the preferred embodiment uses droplines 44 which extend down past the bottom of the clarifier 46 but which only have holes in the area above the bottom of the clarifier 46. There should be enough droplines to adequately aerate the sewage in the upper part of the outer chamber 42, with two through eight generally required. The preferred embodiment uses four such droplines 44 which are evenly spaced in the area of the outer chamber 42.

Figure 4:
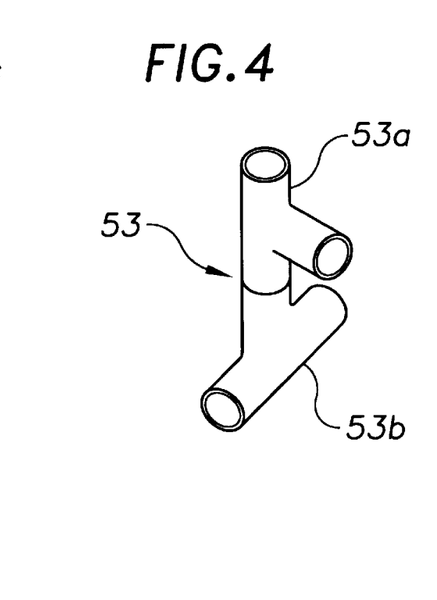
FIG. 4 is a perspective view of the T-Baffle 53 in the TSSTS.

Located near the center of the inner chamber 47 near the top of the aerobic tank 40 is the T-Baffle 53. The T-Baffle functions to draw cleaned effluent from near the top of the sewage surface level in the inner chamber 47 and to transport it through the outlet conduit 55 and into the post-treatment tank 60. The T-Baffle is comprised of two T-joints 53a and 53b rigidly linked together (see FIG. 4). The lower T-joint 53b is located near the surface level, beneath the cleaned effluent so that cleaned effluent will enter through the two openings in the T-joint 53b. This lower T-joint 53b is rigidly attached to a branch of the upper T-joint 53a. One of the other branches of upper T-joint 53a extends up out of the effluent and acts as a vent. The third branch of the upper T-joint 53a is rigidly attached to the outlet conduit 55 which extends outward radially from the central location of the T-Baffle 53, through the outer sidewall joining the aerobic tank 40 to the post-treatment tank 60, and into the post-treatment tank 60. Thus, the T-Baffle 52 and connected outlet conduit 55 transport effluent from the inner chamber 47 of the aerobic tank 40 into the post-treatment tank 60.

Figure 5:
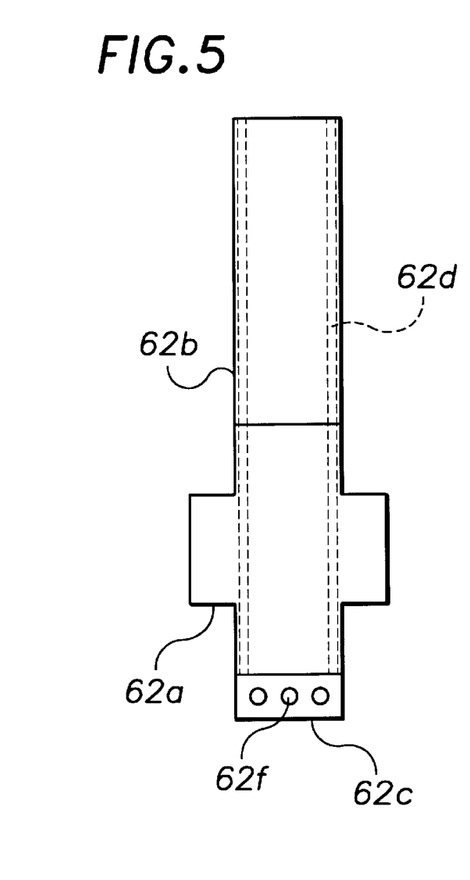
FIG. 5 is a side view of the chlorinator 62 in the TSSTS.

In the post-treatment tank 60, the outlet conduit 55 from the aerobic tank 40 is rigidly attached to a chlorinator 62. The purpose of the chlorinator 62 is to distribute chlorine into the effluent. In the preferred embodiment, the chlorinator 62 distributes chlorine by physical contact of the effluent with chlorine tablets. The chlorinator 62 is comprised of a cross 62a, an external feeding conduit 62b, a cap 62c with holes drilled in it, and a tablet droptube 62d. One branch of the cross 62a is rigidly joined to the outlet conduit 55 from the aerobic tank 40, and another extends outward horizontally into the post-treatment tank 60. The remaining branches of the cross 62a extend in the vertical plane, one branch extending upwards while the other extends downwards. To the upper branch of the cross 62a is connected an external feeding conduit 62b which extends upwards out of the post-treatment tank 60. It is through this external feeding conduit 62b that the chlorine tablets are administered. Rigidly attached to the lower branch of the cross 62a is a cap 62c. The cap 62c would act to prevent the flow of effluent into the post-treatment tank 60 except that the cap 62c has slots in it which allow for the effluent to pass through the cap 62c and into the post-treatment tank 60. The chlorine tablets are loaded into the chlorine droptube 62d, which is a straight conduit that has a small enough diameter to fit into the external feeding conduit 62b. The chlorine droptube 62d is then placed in the external feeding conduit 62c, loading the chlorine into the chlorinator 62. The chlorine droptube 62d has holes in it to allow effluent to pass through the sidewall of the chlorine droptube 62d, making contact with the chlorine tablet before exiting out the cap 62c and into the storage space of the post-treatment tank 60.

The single cover 56 which acts to seal all three tanks of the TSSTS has various openings, risers, and hatches built into it. Over the pre-treatment tank 20, the cover 56 has a hatch 29 which allows for maintenance and cleaning of the pre-treatment tank 20. Over the aerobic tank 40, an inspection riser 59 extends up above ground level. Over the post-treatment tank 60, a pump connection riser 68 extends up above ground level. This pump connection riser 68 has a loose fitting cover for venting air and gases out of the TSSTS. The pump connection riser 68 is sized to allow for installation and maintenance of an internal pump 73. Preferably, a float switch 74 in the post-treatment tank 60 activates an internal pump 73 when the effluent in the post-treatment tank reaches a certain level. In the case of an internal pump 73, a pump seat 75 can be rigidly attached to the bottom of the post-treatment tank 60 to minimize pump movement and stress on the pump line. The effluent is generally pumped out of the pump connection riser 68 beneath the ground through an outlet port drilled in the pump connection riser 68 at the time of installation.

The invention described above employs a three stage procedure for cleaning raw sewage. The raw sewage enters the TSSTS pre-treatment tank 20 through the inlet port 21, which has a sealant around it to prevent any leakage. The sewage is held in the pre-treatment tank 20, allowing anaerobic microorganisms to begin breaking down the sewage. The size of the pre-treatment tank 20 is selected taking into account the typical amount of sewage which will be generated so that the anaerobic microorganisms will have sufficient time to process the sewage. As more sewage enters the pre-treatment tank 20 through the inlet port 21, the treated sewage is displaced upwards in the pre-treatment tank 20. Some of this rising sewage enters the overflow conduit 25. By design, the overflow conduit 25 takes sewage from beneath the sewage surface level, thereby eliminating any contaminants which float upon the surface. In addition, an effluent filter may cover the opening of the overflow conduit 25 to prevent smaller solid contaminants from passing into the aerobic tank 40. In this way, the pre-treatment tank captures large solid contaminants before they can enter the aerobic tank 40, where they could interfere with the sewage treatment process.

The sewage flows through the overflow conduit 25 into the outer chamber 42 of the aerobic tank 40. A sealant around the area in which the overflow conduit 25 passes through the sidewall of the pre-treatment tank 20 prevents any leakage between tanks. As more sewage enters the aerobic tank 40 through the overflow conduit 25, sewage is displaced downward in the outer chamber 42 and passes through the air bubbles emitted from the droplines 44. These air bubbles aerate the sewage, stimulating the aerobic microorganisms so that the aerobic processing of the sewage is greatly enhanced. As the sewage continues to descend in the outer chamber 42, the sewage exits this aeration zone where the air bubbles are emitted by the droplines 44 and enters a quiescent zone near the bottom of the aerobic tank 40. In this quiescent zone, the solid contaminants suspended in the effluent begin to fall towards the bottom of the aerobic tank 40 under the influence of gravity. As more sewage enters the outer chamber 42 from the overflow conduit 25, the aerated sewage in the quiescent zone near the bottom of the aerobic tank 40 is pushed up into the inner chamber 47 inside the clarifier 46. The inner chamber 47 is protected by the walls of the clarifier 46 from the stirring effect of the air bubbles emitted from the droplines 44 in the outer chamber 42, so the inner chamber 47 is a zone of relative calm. As the sewage continues to rise up through the inner chamber 47, the force of gravity continues to pull down the heavier solid contaminants. Thus, the inner chamber 47 acts as a gravity separator, continually segregating the contaminants from the effluent, so that by the time the treated sewage reaches the top of the inner chamber 47, the effluent has been substantially cleaned. Again, the size of the outer chamber 42 and the inner chamber 47 of the aerobic tank 40 are selected based upon the typical amounts of sewage to be processed so that each chamber has sufficient time to perform its cleaning function.

As the treated effluent nears the top of the inner chamber 47, it enters the two bottom openings in the T-Baffle 53. The effluent then flows through the outlet conduit 55, passing out of the inner chamber 47, through the clarifier 46, through the outer chamber 42, through the sidewall of the aerobic tank 40 where it is adjacent to the post-treatment tank 60, and into the post-treatment tank 60. At the point where the outlet conduit 55 passes through the clarifier 46 and the side wall of the aerobic tank 40, a sealant ensures that there is no leakage. In the post-treatment tank 60, the outlet conduit 55 rigidly connects to the chlorinator 62. Thus, the effluent flows into the cross 62a, passes through holes in the chlorine droptube 62d to flow across a chlorine tablet, and then flows down through the holes in the cap 62c to exit the chlorinator 62, chlorinating the effluent before it enters the storage space in the post-treatment tank 60. In the preferred embodiment, the chlorinator 62 uses chlorine tablets designed to ensure that the chlorine content in the effluent passing across it will be at least 1 ppm. The treated effluent is stored in the post-treatment tank 60 until the level of effluent rises high enough to activate a float switch 74 on the internal pump 73. At that point, the internal pump 73 activates and pumps the treated effluent out of the post-treatment tank 60 through the outlet port 69, discharging the now cleaned effluent.

As stated above, the preferred embodiment uses fibreglass reinforced plastic for the three tanks 20, 40, 60, the clarifier 46, and the cover 56. This material selection allows the TSSTS to be relatively light-weight, for ease of installation, yet durable. A strong, lightweight plastic would also be effective. The pipes, conduits, and T-joints in the preferred embodiment can also be made of any non-porous, non-toxic, solid material, but the preferred embodiment uses commercially available PVC components since they are durable and light-weight and since their ready availability simplifies the manufacturing process. In addition, since each tank needs to be sealed to prevent transfer of liquids or gases between them and to prevent leakage of untreated sewage out of the TSSTS, sealant material is used wherever a conduit, pipe, or port passes through a separating wall. Generally, the tanks are sized appropriately depending on the expected sewage production rate of the buildings serviced by the TSSTS, with the size of the aerobic tank 40 being most critical to the sewage cleaning process since the aerobic microorganisms must be given sufficient time to process the sewage. In the preferred embodiment, the aerobic tank 40 holds approximately 1000 gallons, while the pre-treatment tank 20 and the post-treatment tank 60 each hold approximately 516 gallons.

In the aerobic tank 40, the size of the gap between the opening in the bottom of the clarifier 46 and the bottom of the aerobic tank 40 should be big enough to allow for a good flow of sewage from the outer chamber 42 of the aerobic tank 40 into the inner chamber 47. In the preferred embodiment, the gap is approximately 10 inches. In addition, in the preferred embodiment the offset from the top of the aerobic tank 40 to the top of the clarifier main body 46a is approximately 3 inches. Also, the clarifier rim 46c in the preferred embodiment is approximately 9 inches.

Although the size, number, and distribution of air holes in the air droplines 44 can vary, the air holes should be as small as possible without clogging regularly in operation, since this will allow for good air diffusion into the sewage while allowing the TSSTS to operate durably. In the preferred embodiment the holes are $5/64$th of an inch. Each dropline 44 in the preferred embodiment has three vertical columns of holes spaced $3/8$th of an inch apart facing towards the clarifier 46 and running down the length of each dropline 44 from near the top of the aerobic tank 40 and ending just above the opening in the bottom of the clarifier 46. In the preferred embodiment, there are 13 holes, with the holes in each column spaced $3/4$th of an inch apart.

What we claim is:

1. A sewage treatment system comprising:

A pre-treatment tank and a cylindrical aerobic tank, wherein said pre-treatment tank and said aerobic tank are covered and are rigidly joined into a single unit and connected in series so that sewage flows from said pre-treatment tank into said aerobic tank and wherein said pre-treatment tank and said aerobic tank are composed of fibreglass reinforced plastic.

2. A sewage treatment system as in claim 1 wherein said aerobic tank further comprises:

a clarifier that divides said aerobic tank into an inner chamber and an outer chamber, one or more air droplines located within said outer chamber of said aerobic tank, and an outlet drain located within said inner chamber of said aerobic tank.

3. A sewage treatment system as in claim 2 further comprising means for chlorinating the effluent discharged from said aerobic tank and wherein:

said clarifier extends downward in said aerobic tank from near the top of said aerobic tank, whereby the bottom of said clarifier is approximately 10 inches above the bottom of said aerobic tank, and said one or more air droplines emit air bubbles in said outer chamber of said aerobic tank at or above the level of the bottom of said clarifier.

4. A sewage treatment system as in claim 2 wherein said clarifier further comprises:

a funnel-shaped main body with top and bottom openings, and a lip around the top of said clarifier main body.

5. A sewage treatment system as in claim 2 wherein said outlet drain further comprises:

a T-Baffle and an outlet conduit, wherein said T-Baffle is rigidly attached to the open end of said outlet conduit in said inner chamber of said aerobic tank.

6. A sewage treatment system comprising:

a pre-treatment tank, a cylindrical aerobic tank, and a post-treatment tank, wherein said pre-treatment tank, said aerobic tank, and said post-treatment tank are covered and are rigidly joined into a single unit and connected in series so that sewage flows from said pre-treatment tank through said aerobic tank and into said post-treatment tank, wherein said aerobic tank further comprises a clarifier which divides said aerobic tank into an inner chamber and an outer chamber, one or more air droplines located within said outer chamber of said aerobic tank, and an outlet drain located within said inner chamber of said aerobic tank, and wherein said clarifier further comprises:

a funnel-shaped main body with top and bottom openings;

a lip by which said clarifier overhangs the top of said aerobic tank; and an offset wherein said clarifier main body is held slightly below the level of said lip and whereby the top of said main body of said clarifier is below the top of said aerobic tank.

7. A sewage treatment system as in claim 6 wherein said clarifier further comprises a rim between said lip of said clarifier and said main body of said clarifier, such that said rim is separated from said lip by said offset.

8. A sewage treatment system as in claim 7 further comprising an air feed conduit and whereby:

said air feed conduit transmits air to said air droplines, and said air feed conduit is located on said rim of said clarifier.

9. A sewage treatment system as in claim 7 wherein said clarifier extends downward within said aerobic tank from near the top of said aerobic tank towards the bottom of said aerobic tank whereby there is a gap between the bottom of said aerobic tank and the bottom opening in said clarifier.

10. A sewage treatment system as in claim 9 wherein said pre-treatment tank, said aerobic tank, and said post-treatment tank are composed of fibreglass reinforced plastic.

11. A sewage treatment system as in claim 9 wherein said air droplines in said outer chamber of said aerobic tank emit air bubbles into said outer chamber of said aerobic tank at or above the level of the bottom of said clarifier.

12. A sewage treatment system comprising:
a pre-treatment tank, a cylindrical aerobic tank, and a post-treatment tank, wherein said pre-treatment tank, said aerobic tank, and said post-treatment tank are covered and are rigidly joined into a single unit and connected in series so that sewage flows from said pre-treatment tank through said aerobic tank and into said post-treatment tank, wherein said aerobic tank further comprises a clarifier which divides said aerobic tank into an inner chamber and an outer chamber, one or more air droplines located within said outer chamber of said aerobic tank, and an outlet drain located within said inner chamber of said aerobic tank, and wherein said pre-treatment tank, said aerobic tank, and said pot-treatment tank are composed of fibreglass reinforced plastic.

13. A sewage treatment system comprising:
a pre-treatment tank, an aerobic tank, and a post-treatment tank, wherein said pre-treatment tank, said aerobic tank, and said post-treatment tank are composed of fibreglass reinforced plastic and are rigidly joined into a single unit and are connected so that sewage in said pre-treatment tank flows through said aerobic tank and into said post-treatment tank;

a single cover, wherein each of said pre-treatment tank, said aerobic tank, and said post-treatment tank are sealed;

said single cover further comprising three domed sections, wherein one of said domed sections seals said pre-treatment tank, one of said domed sections seals said aerobic tank, and one of said domed sections seals said post-treatment tank;

an inlet port in said pre-treatment tank through which sewage enters said pre-treatment tank;

an overflow conduit, through which sewage flows from said pre-treatment tank into said aerobic tank;

said aerobic tank further comprising;
a funnel-shaped clarifier with top and bottom openings, a plurality of air droplines containing holes, and an outlet drain, wherein said clarifier divides said aerobic tank into an inner chamber within said clarifier, and an outer chamber between the sidewalls of said aerobic tank and said clarifier; and further wherein said clarifier extends downward in said aerobic tank from near the top of said aerobic tank towards the bottom of said aerobic tank, leaving a gap between the opening in the bottom of said clarifier and the bottom of said aerobic tank such that sewage is able to flow from said outer chamber into said inner chamber of said aerobic tank;

said post-treatment tank further comprising means for chlorinating the effluent flowing into said post-treatment tank from said aerobic tank through said outlet drain;

said clarifier further comprising a funnel-shaped main body, a lip, an offset, and a rim;

said air droplines being located in said outer chamber of said aerobic tank and emitting air bubbles into said outer chamber only at or above the level of the bottom of said clarifier, whereby beneath the level of the bottom of said clarifier there exists a quiescent zone of relatively calm sewage; and said outlet drain further comprising a T-Baffle and an outlet conduit, said T-Baffle being rigidly attached to the open end of said outlet conduit located within said inner chamber of said aerobic tank near the top of said inner chamber, whereby said outlet conduit directs effluent out of said inner chamber of said aerobic tank to said means for chlorinating effluent located within said post-treatment tank.

14. A sewage treatment system as in claim 13 wherein said gap between the opening in the bottom of said clarifier and the bottom of said aerobic tank is approximately 10 inches, wherein said air droplines are distributed in said outer chamber of said aerobic tank such that sewage passing through said outer chamber is effectively aerated, and wherein said air holes in said air droplines face towards said clarifier.

15. A sewage treatment system as in claim 13 wherein said aerobic tank is cylindrical and wherein said lip overhangs the top of said aerobic tank, said offset connects said lip to said rim, and said rim connects said offset to said main body of said clarifier.

16. A sewage treatment system as in claim 15 further comprising an air feed conduit and whereby:
said air feed conduit transfers air to said air droplines, and
said air feed conduit is located on said rim of said clarifier.

17. A sewage treatment system as in claim 15 wherein said post-treatment tank further comprises a float switch and a pump, whereby said float switch activates said pump when the effluent in said post-treatment tank rises to a certain level, whereby the effluent is pumped out of said post-treatment tank.

18. A sewage treatment system as in claim 17 wherein said post-treatment tank further comprises a pump seat.

19. A sewage treatment system comprising a tank, a cover, an inlet port, a plurality of droplines, an air feed conduit, an outlet drain, and a clarifier, wherein said clarifier is further comprised of a funnel-shaped main body with top and bottom openings, a lip, an offset, and a rim, and wherein said air feed conduit is located on said rim of said clarifier.

* * * * *

(12) EX PARTE REEXAMINATION CERTIFICATE (5143rd)
United States Patent
Donald et al.

(10) Number: US 6,200,472 C1
(45) Certificate Issued: Jul. 12, 2005

(54) THREE STAGE SEWAGE TREATMENT SYSTEM

(75) Inventors: Hubbard H. Donald, 2247 Hwy. 151 North, Downsville, LA (US) 71234; George E. Johnson, 2247 Hwy. 151 North, Downsville, LA (US) 71234

(73) Assignees: Hubbard H. Donald, Downsville, LA (US); George E. Johnson, Downsville, LA (US)

Reexamination Request:
No. 90/006,299, May 24, 2002

Reexamination Certificate for:
Patent No.: 6,200,472
Issued: Mar. 13, 2001
Appl. No.: 09/280,492
Filed: Mar. 30, 1999

Related U.S. Application Data

(60) Provisional application No. 60/079,891, filed on Mar. 30, 1998.

(51) Int. Cl.$^7$ .................................................. C02F 3/20
(52) U.S. Cl. ................................. 210/195.1; 210/195.4; 210/202; 210/256; 210/259; 210/532.2

(56) References Cited

U.S. PATENT DOCUMENTS

| | | | | |
|---|---|---|---|---|
| 1,715,466 A | * | 6/1929 | Miller | 52/236.2 |
| 3,907,672 A | * | 9/1975 | Milne | 210/605 |
| 4,317,723 A | * | 3/1982 | Rapp et al. | 210/202 |
| 4,650,577 A | | 3/1987 | Hansel | 210/195.3 |
| 4,664,795 A | * | 5/1987 | Stegall et al. | 210/202 |
| 4,882,046 A | | 11/1989 | Waite | 210/195.3 |
| 4,934,553 A | * | 6/1990 | McCarthy | 220/567.2 |
| 4,983,285 A | | 1/1991 | Nolen | 210/197 |
| 5,055,186 A | * | 10/1991 | Van Toever | 210/150 |
| 5,104,542 A | | 4/1992 | Dixon et al. | 210/532.2 |

(Continued)

FOREIGN PATENT DOCUMENTS

CH 566246 * 9/1975

OTHER PUBLICATIONS www.vdh.state.va.us/onsite/text/secondar.htm, Oct. 25, 2001 (downloaded on Jun. 14, 2002).*

(Continued)

*Primary Examiner*—Chester T. Barry (57) ABSTRACT

The Three Stage Sewage Treatment System ("TSSTS") processes sewage for buildings not connected to a municipal sewer system. It employs a three stage process for cleaning sewage in a single, light-weight, easy-to-install unit. Sewage is initially cleaned anaerobically in the pre-treatment tank as gravity acts to separate solids from the effluent. Sewage then flows into the aerobic tank for further cleaning by aerobic microorganisms and continued gravity separation of solid contaminants from the effluent. The aerobic tank is divided into an inner chamber and an outer chamber by a funnel-shaped clarifier. In the TSSTS, the clarifier is a separate piece with a lip around the top of the funnel-shaped main body. The lip of the clarifier rests atop the sidewalls of the aerobic tank, and the clarifier hangs down in the aerobic tank, with an opening in the bottom of the clarifier held above the bottom of the aerobic tank. Air droptubes hang down in the outer chamber of the aerobic tank, so that sewage in the upper part of the outer chamber is aerated, stimulating anaerobic microorganisms which digest the sewage. An air feed conduit connects the air droplines to an external air compressor and rests upon a rim on the clarifier. The sewage in the outer chamber moves into the inner chamber inside the clarifier where gravity separates solids from the effluent. This cleaned effluent is then drained to the post-treatment tank where it is chlorinated and stored for discharge. The TSSTS uses a single cover to seal all three tanks, adding structural support while simplifying manufacture. To reduce the weight, aiding in installation, while retaining the strength and durability needed for a sewage system, the TSSTS is generally made of fibreglass reinforced plastic.

U.S. PATENT DOCUMENTS

| | | | | |
|---|---|---|---|---|
| 5,207,899 A | * | 5/1993 | Boyle | 210/138 |
| 5,221,470 A | | 6/1993 | McKinney | 210/151 |
| 5,266,239 A | | 11/1993 | Drewery | 261/64.3 |
| 5,407,564 A | * | 4/1995 | Thrailkill | 210/167 |
| 5,427,334 A | * | 6/1995 | Rauscher, Jr. | 244/135 R |
| 5,490,935 A | | 2/1996 | Guy | 210/620 |
| 5,549,818 A | | 8/1996 | McGrew, Jr. | 210/195.4 |
| 5,783,071 A | | 7/1998 | Guy | 210/195.1 |
| 5,874,002 A | | 2/1999 | Cormier | 210/626 |
| 5,879,550 A | * | 3/1999 | Cox | 210/195.4 |
| 5,985,149 A | * | 11/1999 | Raetz et al. | 210/617 |
| RE36,660 E | * | 4/2000 | Goldman et al. | 210/618 |
| 6,180,004 B1 | * | 1/2001 | Drewery | 210/221.2 |

OTHER PUBLICATIONS

Approved Aerobic Treatment Units (ATU's) dated Dec. 19, 2001, http://www.deg.enr.state.nc.us/oww/Atu/atu.htm (downloaded Jul. 11, 2002).*

Southern Manufacturing Brochure for "The Southern".

Delta Fiberglass & Environmental Products Brochure for the "ECO–TECH 500 Camp Unit".

Delta Fiberglass Drawing #A–1625.

Delta Environmental Drawing #00013.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13–18 is confirmed.

Claim 1 is cancelled.

Claims 2, 6, 12 and 19 are determined to be patentable as amended.

Claims 3–5 and 7–11, dependent on an amended claim, are determined to be patentable.

2. A sewage treatment system [as in claim 1] *comprising a pre-treatment tank and a cylindrical aerobic tank, wherein:*
   *said pre-treatment tank and said aerobic tank externally abut one another lengthwise to share a common wall, are covered, are rigidly joined into a single unit that acts as an integrated structural whole, and are connected in series so that sewage flows from said pre-treatment tank into said aerobic tank; and*
   *said pre-treatment tank and said aerobic tank are composed of fibreglass reinforced plastic; and*
   wherein said aerobic tank further comprises[:] a clarifier that divides said aerobic tank into an inner chamber and an outer chamber, one or more air droplines located within said outer chamber of said aerobic tank, and an outlet drain located within said inner chamber of said aerobic tank.

6. A sewage treatment system comprising:
   a pre-treatment tank, a cylindrical aerobic tank, and a post-treatment tank, *wherein said pre-treatment tank and said post-treatment tank externally abut said cylindrical aerobic tank lengthwise to share a common wall with said aerobic tank,* wherein said pre-treatment tank, said aerobic tank, and said post-treatment tank are covered and are rigidly joined into a single unit *that acts as an integrated structural whole,* and *are* connected in series so that sewage flows from said pre-treatment tank through said aerobic tank and into said post-treatment tank, wherein said aerobic tank further comprises a clarifier which divides said aerobic tank into an inner chamber and an outer chamber, one or more air droplines located within said outer chamber of said aerobic tank, and an outlet drain located within said inner chamber of said aerobic tank, and wherein said clarifier further comprises :
   a funnel-shaped main body with top and bottom openings;
   a lip by which said clarifier overhangs the top of said aerobic tank; and
   an offset wherein said clarifier main body is held slightly below the level of said lip and
   whereby the top of said main body of said clarifier is below the top of said aerobic tank.

12. A sewage treatment system comprising:
   a pre-treatment tank, a cylindrical aerobic tank, and a post-treatment tank, *wherein said pre-treatment tank and said post-treatment tank externally abut said aerobic tank lengthwise to share a common wall with said aerobic tank,* wherein said pre-treatment tank, said aerobic tank, and said post-treatment tank are covered and are rigidly joined into a single unit *that acts as an integrated structural whole* and *are* connected in series so that sewage flows from said pre-treatment tank through said aerobic tank and into said post-treatment tank, wherein said aerobic tank further comprises a clarifier which divides said aerobic tank into an inner chamber and an outer chamber, *a plurality of* [one or more] air droplines located within said outer chamber of said aerobic tank, and an outlet drain located within said inner chamber of said aerobic tank, and wherein said pre-treatment tank, said aerobic tank, and said pot-treatment tank are composed of fibreglass reinforced plastic.

19. A sewage treatment system comprising a tank, a cover, an inlet port, a plurality of droplines, an air feed conduit, an outlet drain, and a clarifier, wherein said clarifier is further comprised of a funnel-shaped main body with top and bottom openings, a lip, an offset, and a rim, *wherein said clarifier is of integral, one-piece construction, and* wherein said air feed conduit is located on said rim of said clarifier.

\* \* \* \* \*